United States Patent [19]
Zimmerman et al.

[11] Patent Number: 5,189,075
[45] Date of Patent: Feb. 23, 1993

[54] POLYUREA ELASTOMERS MADE USING POLYOXYALKYLENE TETRA-OR HIGHER FUNCTIONAL AMINE CHAIN EXTENDERS

[75] Inventors: Robert L. Zimmerman, Austin; Dudley J. Primeaux, Elgin, both of Tex.

[73] Assignee: Texaco Chemical Co., White Plains, N.Y.

[21] Appl. No.: 838,990

[22] Filed: Feb. 21, 1992

[51] Int. Cl.$^5$ ............................................. C08G 18/14
[52] U.S. Cl. .................................. 521/159; 521/163; 521/167; 528/60; 528/61; 528/66; 528/76; 528/77
[58] Field of Search ............ 521/159, 163, 167; 528/60, 61, 66, 76, 77

[56] References Cited

U.S. PATENT DOCUMENTS 3,654,370  4/1972  Yeakey ............................ 260/584 B
4,732,919  3/1988  Grigsby, Jr. et al. ................ 521/159

OTHER PUBLICATIONS

U.S. Patent Application Serial No. 750,030 filed Aug. 26, 1991, (Primeaux et al.).
U.S. Patent Application Serial No. 652,954 filed Feb. 8, 1991 (Primeaux).
D. J. Primeaux II—"Spray Polyurea, Versatile High Performance Elastomer for the Polyurethane Industry", *Proceedings of the SPI 32nd Annual Technical/Marketing Conference*, pp. 126–130, Oct. 1989.
D. J. Primeaux II—"Sprayed Polyurea Elastomers Offer Superior Performance", *UTECH'90*, pp. 189–194, Apr. 1990.

*Primary Examiner*—Maurice J. Welsh
*Attorney, Agent, or Firm*—James J. O'Loughlin; Henry H. Gibson

[57] ABSTRACT

Polyurea elastomers, made using low molecular weight polyoxyalkylene polyamines, like aminated, propoxylated α-methyl glucoside, as chain extenders for reactions of polyoxyalkylene polyamine with polyisocyanate, have improved spray and foam properties, including faster cure and foam stability.

15 Claims, No Drawings

POLYUREA ELASTOMERS MADE USING POLYOXYALKYLENE TETRA-OR HIGHER FUNCTIONAL AMINE CHAIN EXTENDERS

BACKGROUND OF THE INVENTION

Field of the Invention

This invention concerns polyurea elastomers, useful as foams and in solventless spray coatings, and more particularly to polyurea elastomers made using low molecular weight, polyoxyalkylene tetra- or higher functional amines, like aminated propoxylated α-methyl glucoside, as chain extenders.

Description of Related Information

Polyurea elastomers have found widespread utility, including as coatings, such as for spray applications, and as foams. When used in coatings, these materials provide a desirable balance of properties including: light stability; fast cure; relative water insensitivity; solventless systems; excellent physical properties, including tensile strength, elongation and abrasion resistance; pigmentation capability; ease of application, such as using commercially available spray application equipment; and, since no catalyst is needed, consistent reactivity and long term storage stability. These and other well known properties are discussed in the literature, such as by D. J. Primeaux II, in "Spray Polyurea, Versatile High Performance Elastomer for the Polyurethane Industry", *Proceedings of the SPI 32nd Annual Technical/Marketing Conference*, pages 126-130, October 1989; and by D. J. Primeaux II, in "Sprayed Polyurea Elastomers Offer Superior Performance", *UTECH'90*, pages 189-194, April 1990.

Polyureas are useful in a variety of foam applications including, among others: molded foams, such as in automobile interiors like seating and so on; slabstock foams, frequently used as carpet underlay or in furniture; and various other padding or cushioning uses. Foams having rigid, closed-cell structure are useful as insulation; simulated wood parts like speaker cabinets, picture frames, doors and the like; packaging foams; shock absorbing foams; and so on. Such foams should have good tensile strength, elongation, compressive strength, dimensional stability and other desired properties in order to perform well in these or other applications.

Polyureas can be made by reacting amines with isocyanates. For example, U.S. Pat. No. 4,732,919 (Grigsby, Jr. et al.) discloses polyurea elastomer made from high molecular weight polyol or polyoxyalkylene polyamine, chain extender and quasi-prepolymer of polyoxyalkylene polyamine and aromatic isocyanate. U.S. patent application Ser. No. 750,030 filed Aug. 26, 1991 (Primeaux et al.) D#81,026 discloses polyurea elastomers made using quasi-prepolymers having isocyanate functionality over 2, derived from polyoxyalkylene polyamine mixtures, preferably of diamines and triamines. Foamed polyurea elastomers are described in U.S. patent application Ser. No. 652,954 filed Feb. 8, 1991 (Primeaux) D#81,009 made by reacting isocyanate with polyoxyalkylene polyamine and chain extender, with water as blowing agent and surfactant as foam stabilizer. Polyoxyalkylene polyamines made from polyoxyalkylene polyols obtained by oxyalkylene addition to polyhydric aliphatic alcohols, including methyl glucoside among others, are disclosed in U.S. Pat. No. 3,654,370 (Yeakey) as intermediates for polyurea preparation.

SUMMARY OF THE INVENTION

This invention concerns polyurea elastomer which is the product of: (A) polyisocyanate, reacted with; (B) di- and/or tri-functional polyoxyalkylene polyamine and low molecular weight, polyoxyalkylene polyamine chain extender having at least 4 functional groups including two or more amino groups. Foams comprising gas and the polyurea are also provided. There is also a process for making polyurea elastomer comprising: (1) reacting polyisocyanate with; (2) di- and/or tri-functional polyoxyalkylene polyamine and low molecular weight, polyoxyalkylene polyamine chain extender having at least 4 functional groups including two or more amino groups.

DETAILED DESCRIPTION OF THE INVENTION

It has been discovered that polyurea elastomer can be made using polyoxyalkylene polyamine chain extender having high functionality, which polyurea provides superior foams and spray coatings with improved physical properties.

The polyisocyanate starting material may be any, including known, compound, or mixtures thereof, having two or more isocyanate groups bonded to an organic radical. The polyisocyanate may be a monomeric polyisocyanate or, preferably, the reaction product of a monomeric polyisocyanate with polyoxyalkylene polyamine, such as a polyurea polyisocyanate quasi-prepolymer. The term "quasi-prepolymer" describes a mixture of monomers and oligomers, essentially dimers, made using a stoichiometric excess of one type of monomer, in this case polyisocyanate, as compared with the other monomer, i.e. polyamine. Polyisocyanates include compounds shown by Formula 1.

$$R''(-NCO)_z \quad (1)$$
Polyisocyanate

In Formula 1, R" is an organic radical having a valence z and can be: straight or branch chain; acyclic, cyclic, or heterocyclic; saturated, unsaturated, or include aromatic; unsubstituted or halo-substituted; hydrocarbylene having at least 1, preferably from about 6 to about 25, and most preferably from about 6 to about 12 carbon atoms. The number of isocyanate groups, defined by z, is at least 2, preferably from 2 to about 4, and most preferably 2. Typical polyisocyanates include, among others, one or more of the following: alkylene polyisocyanates with 4 to 12 carbon atoms in the alkylene radical, such as 1, 12 dodecane diisocyanate, 1,4-tetramethylene diisocyanate and 1,6-hexamethylene diisocyanate; cycloaliphatic diisocyanates such as 1,3- and 1,4-cyclohexane diisocyanate, 1-isocyanato-3,3,5-trimethyl-5-isocyanatomethylcyclohexane (isophorone diisocyanate), 4,4'-, 2,2'- and 2,4'-dicyclohexylmethane diisocyanate; aromatic polyisocyanates, such as p-phenylene diisocyanate, polymethylene polyphenyl isocyanate, 2,4-/2,6-toluene diisocyanate (TDI) dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, 4,4'-diphenylpropane diisocyanate, and methylene-bridged polyphenyl polyisocyanate mixtures, such as those containing methylene diphenyldiisocyanate isomers like methylene bis(4-phenylisocyanate) (MDI); alkaryl and aralkyl diisocyanates, such as tetraalkylxylene diisocyanates like tetramethylxylene diisocyanate; trimerized or biuretic polyisocyanates, and other isocyanates, such as described in U.S. Pat. No. 2,683,730 (Fauser et al.), U.S. Pat. No. 2,950,263 (Abbostson et al.), U.S. Pat. No. 3,012,008 (Lister), U.S. Pat. No. 3,344,162 (Rowton), U.S. Pat. No. 3,362,979 (Bentley) and U.S. Pat. No. 3,394,164 (Kolakowski et al.). Preferred polyisocyanates include tetramethylxylene diisocyanate, isophorone diisocyanate, hexamethylene diisocyanate, cyclohexane diisocyanate, and the like.

The polyoxyalkylene polyamine, such as used to make either polyisocyanate quasi-prepolymer or as component (B) and other than the low molecular weight, polyoxyalkylene polyamine chain extender, may be any, including known, polyoxyalkylene polyamine, including mixtures thereof. The polyoxyalkylene polyamine can be a primary and/or secondary amine-terminated polyether polyol typically having: a weight average molecular weight of more than about 100 and preferably from about 200 to about 5,000; a functionality of from 2 to 6, and preferably from 2 to 3; and an amine equivalent weight of from about 750 to about 4,000. Polyoxyalkylene polyamines include compounds shown in Formula 2.

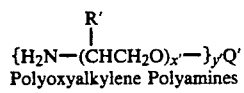

Polyoxyalkylene Polyamines

The variables in Formula 2 have the following meanings. Q' is the polyvalent residue of an active hydrogen-containing compound used as an initiator. The valence of Q' is given by y', where y' is at least 2, preferably from 2 to 8, and most preferably 2 to 3. Each R' is independently hydrogen or lower alkyl, such as methyl or ethyl. The R' groups are preferably hydrogen and/or methyl, including their mixtures. The average number of oxyalkylene repeating units per amine, given by x'. is at least about 1, preferably from about 1 to about 40, and most preferably from about 1 to about 10.

Typical initiators include, among others, one or more of the following: polyhydroxy compounds, including diols like ethylene glycol, propylene glycol, 1,2- or 1,4-butanediols, and triols like trimethylolpropane and glycerine. Preferred initiators include ethylene glycol, propylene glycol, trimethylolpropane, and glycerine. Typical oxyalkylene repeating units include oxyethylene, oxypropylene, oxybutylene, and so on, including mixtures thereof. When two or more oxyalkylenes are used, they may be present in any form such as randomly or in blocks. Preferred polyoxyalkylene polyamines include JEFFAMINE ® polyoxyalkylene amines from Texaco Chemical Co. Inc., such as diamines D-230, D-400, D-2000 and D-4000, and triamines T-403, T-3000 and T-5000.

The relative amount of monomeric polyisocyanate to polyoxyalkylene polyamine for quasi-prepolymer production is at least a stoichiometric excess of monomeric polyisocyanate to polyoxyalkylene polyamine. Generally more than 1, preferably from about 1.5 to about 25, and most preferably from about 10 to about 25, equivalent moles of isocyanate are used per mole of amine.

Although no additional ingredients, such as solvent or catalyst, are needed or preferred to conduct the quasiprepolymer synthesis reaction, any other suitable materials may be present, if desired.

The reaction between the monomeric polyisocyanate and the polyoxyalkylene polyamine may be conducted under any effective, including known, conditions for reacting isocyanates with amines. Typically, reactions are conducted under ambient temperature and pressure. Since the reaction precedes rapidly, the ingredients are preferably thoroughly mixed, such as using a high speed mixer.

The low molecular weight, polyoxyalkylene polyamine chain extender includes compounds shown in Formula 3.

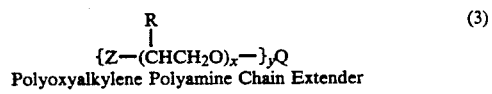

Polyoxyalkylene Polyamine Chain Extender

The variables in Formula 3 have the following meanings. Q is the polyvalent residue of an active hydrogen-containing compound after removal of the active hydrogen, used as an initiator for making polyoxyalkylene polyols through oxyalkylation and then amination to produce tetra- or higher-functional polyoxyalkylene amines. The valence of Q, given by y, is at least 4, preferably from 4 to about 8, and most preferably 4. Each R is independently hydrogen or lower alkyl, such as methyl or ethyl. The R groups are preferably hydrogen and/or methyl, including their mixtures. The average number of oxyalkylene repeating units per functional group, given by x, is at least 0.5, preferably from about 0.5 to about 3, and most preferably from about 1 to about 2. Z is a functional group, generally amino ($H_2N-$) or hydroxyl (HO—), providing polyamine functionality, by which is meant a compound having a plurality of amino or other groups which react with isocyanate to form polyureas. Accordingly, two or more Z are amino groups with any remaining Z groups hydroxyl or other active hydrogen groups, such as thiol or the like. Preferably, at least half, and most preferably an average of about 60% of Z are amino, including mixtures of compounds having a distribution of different functional groups for Z. Mixtures of chain extender may contain minor portions of compounds having less than two amino groups provided the average number of amino groups per molecule in the mixture is two or more.

Typical initiators for the polyoxyalkylene polyamine chain extenders include, among others, one or mixtures of the following: polyhydroxy compounds, including saccharides like α-methyl glucoside, sucrose, sorbitol, xylitol, inositol, mannitol and pentaerythritol; ditrimethylolpropane; and the like. A preferred initiator is α-methyl glucoside.

The polyoxyalkylene polyols used to make chain extender have a small amount of oxyalkylene units. Typically an average of at least 1 to about 40, preferably from 1 to about 10, oxyalkylene units are present per molecule. Typical oxyalkylene repeating units include oxyethylene, oxypropylene, oxybutylene, and so on, including mixtures thereof. When two or more oxyalkylenes are used, they may be present in any form such as randomly or in blocks. Preferred polyoxyalkylene polyamine chain extenders include α-methyl glucoside having an average of about 4 oxypropylene repeating units.

The chain extenders can be made by alkoxylating active hydrogen-containing compounds by any effective, including known, process. For example, alkylene oxide can be reacted with active hydrogen-containing compound in the presence of a base catalyst at elevated temperature and pressure under an inert atmosphere for several hours. The alkaline product can then be neutralized and isolated, such as by vacuum stripping and filtration.

The polyoxyalkylene polyols can be partially or completely aminated to produce the polyoxyalkylene polyamine chain extenders by any effective, including known, procedure. Generally, the polyol reacts with any aminating material, preferably ammonia and hydrogen or the like, which results in amino group substitution in place of hydroxyl or other active hydrogen on the polyol. The relative amount of polyoxyalkylene polyol to aminating material is any amount sufficient to make aminated product. Typically, the molar ratio of hydroxy to aminating group is from about 1:2 to about 1:40, preferably from about 1:5 to about 1:30, and most preferably from about 1:10 to about 1:20. The polyoxyalkylene polyol may be aminated using any effective catalyst and under any effective conditions. Typically, the temperature during the amination reaction may range from about 180° C. to about 240° C., preferably from about 190° C. to about 220° C., and most preferably from about 200° C. to about 215° C. The pressure may range at least about 100, preferably from about 500 to about 3,000, and most preferably from about 1,500 to about 2,500, psig. The amination reaction is generally conducted as a continuous process. The rate at which product passes through the reactor is generally from about 0.05 to about 3, preferably from about 0.1 to about 2, and most preferably from about 0.2 to about 1, grams of product per cc. of catalyst per hour (gm/cc/hr.).

Any effective, including known, amination catalyst can be used. Typical amination catalysts include, among others, one or mixtures of the following: nickel-chromium-copper metal or metal oxides, such as described in U.S. Pat. No. 3,152,998; or other effective catalyst. Preferred amination catalysts include: those prepared by reducing nickel, copper and chromium oxides in the presence of hydrogen, generally at a temperature of from about 250° to 400° C. and at any effective pressure, following established procedures. The catalyst generally has: from about 60 to about 85, preferably from about 70 to about 80, mole percent nickel; from about 14 to about 37, preferably from about 20 to about 25, mole percent copper; and from about 1 to about 5 mole percent chromium.

The chain extender has a relatively low molecular weight based on the presence of a small number of oxyalkylene units. Typically, the chain extender molecular weight is less than about 500, preferably from about 50 to about 400.

The relative amount of polyisocyanate to polyoxyalkylene polyamine and chain extender is any amount sufficient to make polyurea elastomer. Typically, from about 0.7 to about 1.6, preferably from about 0.8 to about 1.3, and most preferably from about 0.85 to about 1.15, moles of amine are provided per mole of isocyanate. The relative proportion of polyoxyalkylene polyamine to chain extender is not critical so long as an effective amount, i.e. an amount sufficient to make polyurea elastomer having improved properties, of chain extender is provided. Typically, from about 10 to about 60, preferably from about 20 to about 50, and most preferably from about 30 to about 50, weight percent chain extender is provided, based on the amount of polyoxyalkylene polyamine.

Other materials may be added, if desired, to the reaction. These optional ingredients include, among others, one or mixtures of the following: other chain extenders, such as aromatic diamines like 1-methyl-3,5-diethyl-2,4 or 2,6-diaminobenzene (also called diethyltoluene diamine), 1,3,5-triethyl-2,6-diaminobenzene, 3,5,3',5'-tetraethyl-4,4'-diaminodiphenylmethane, di(methylthio)-toluene diamines including 3,5-di(methylthio) 2,4 and 2,6-toluene diamine, N,N'-bis(t-butyl) ethylene diamine, or low molecular weight polyoxyalkylene polyamines like polyoxypropylene diamines or triamines including JEFFAMINE ® D-230 and T-403, respectively; foam stabilizers, such as silicone oil, silicon emulsifier, organic silane or siloxane like cyanoalkyl-polysiloxanes, hydrolyzable or non-hydrolyzable, polysiloxane-polyoxyalkylene block copolymers, including L-5340, L-5421, Y-10184 and Y-10197 from Union Carbide Chemicals and Plastics Co., Inc.; pigments or coloring agents, such as titanium dioxide; reinforcing materials, such as chopped or milled glass fibers, carbon fibers and/or other mineral fibers; blowing agents like water, carbon dioxide, (hydro)chlorofluorocarbons, methylene chloride and acetone; catalysts, such as tertiary amines like one or mixtures of 2,2'-dimorpholinediethyl ether, N,N'-dimethylpiperazine, N-butylmorpholine, N-methyl-morpholine, N-ethylmorpholine, bis(2,2'-dimethylamino) ethyl ether, 2-(2-dimethylaminoethoxyl)ethanol, N,N,N'-trimethyl-N'-hydroxyethyl-bisaminoethyl ether, 4-(2-methoxyethyl) morpholine or organic tin compounds; fillers; surfactants; mold release agents such as zinc stearate, sodium oleate and silicones; and any other suitable materials.

The polyisocyanate, polyoxyalkylene polyamine and chain extender, along with any other optional ingredients, are reacted under any effective, including known, conditions for reacting polyamines with polyisocyanate. Typically, the temperature during the reaction may range from about 0° C. to about 80° C., preferably from about 15° C. to about 80° C., and most preferably from about 25° C. to about 75° C. The components can be combined under ambient or higher pressures of up to 3,000, preferably from about 500 to about 2,500, and most preferably from about 1,000 to about 2,000, psig.

When used in spray applications, the components can be impingement mixed directly using high pressure spray equipment, such as a GUSMER ® VR-H-2000 proportioner fitted with a GUSMER ® Model GX-7 spray gun where open mold work or coating is desired or, where closed mold work is desired, such as in reaction-injection-molding (RIM) or reinforced-reaction-injection-molding (RRIM), the proportioner can be fitted with suitable, including standard, RIM or RRIM equipment. In particular, first and second pressurized streams of components (A) and (B), respectively, are delivered from two separate chambers of a proportioner and impacted or impinged upon each other at high velocity for intimate mixing of the two components producing the elastomer which is then delivered onto or into desired substrate using the spray gun or RIM equipment. The volumetric ratio of components (A) to (B) may be any suitable amount, typically from about 3:7 to 7:3. The components are typically applied at a rate of at least 0.5, and preferably from about 1 to about 30, and most preferably at about 20 pounds per minute.

The polyurea elastomer may, optionally, undergo post curing by heating, such as following established procedures. Post curing is typically employed where flexible, open cell foams are produced to improve elastomeric properties, such as heat sag. In contrast, rigid, closed cell polyurea foams of this invention generally do not undergo post curing.

The low molecular weight, polyoxyalkylene polyamine acts as a chain extender for the reaction between the polyisocyanate and the polyoxyalkylene polyamine. The chain extender reacts with the polyisocyanate providing hard-segment segregation in the elastomeric polyurea product resulting in increased polymer modulus and glass transition temperature as well as thermal stability. The polyurea may have a small amount of urethane or other bonds formed from isocyanate reaction with hydroxyl or other active hydrogen groups in the chain extender. There may also be some unreacted functional groups, such as hydroxyl which is less reactive than amine with isocyanate.

It has been discovered that polyurea made using low molecular weight, polyoxyalkylene polyamine chain extender having at least 4 functional groups provides foams with improved strength and spray coatings with improved modulus properties. Foams with greater compressive strength withstand increased loads without collapsing. Coatings with higher modulus or stiffness provide increased support to materials to which the coating is applied.

The following examples present illustrative embodiments of this invention without intention to limit its scope. All percentages given in the disclosure and claims are in weight percent, unless otherwise stated.

EXAMPLES

Terms used in the examples have the following meanings:

| Term | Description |
|---|---|
| D-230 | Polyoxypropylene diamine having a weight average molecular weight of about 230, called JEFFAMINE ® D-230 from Texaco Chemical Co. Inc. |
| D-2000 | Polyoxypropylene diamine having a weight average molecular weight of about 2,000, called JEFFAMINE ® D-2000 from Texaco Chemical Co. Inc. |
| DC-193 | Silicone surfactant, called DC-193 from Dow Corning Co. |
| DEDTA | Diethyltoluene diamine, called ETHACURE ® 100 from Ethyl Corp. |
| GENTRON ® 123 | 1,1-Dichloro-2,2,2-trifluoroethane, called GENTRON ® 123 from Allied-Signal Inc. |
| L-5309 | Polysiloxane-polyoxyalkylene block copolymer, called L-5309 from Union Carbide Chemicals and Plastics Co. Inc. |
| LF-168 | Liquid modified methylene diisocyanate (uretonimine), called RUBINATE ® LF-168 from ICI Chemicals Co. |
| MDI Polymer | Methylene diisocyanate polymer called RUBINATE ® M from ICI Chemicals Co. |
| m-TMXDI ® | m-α,α,α',α'-tetramethyl-α,α'-diisocyanatoxylene, i.e. 1,3-bis(1-isocyanato-1-methylethyl)benzene, called m-TMXDI ® from American Cyanamid Co. Inc. |
| PPG-2000 | Polyoxypropylene of about 2000 molecular weight, called TEXOX ® PPG-2000 from Texaco Chemical Company. |
| T-403 | Polyoxypropylene triamine, made with trimethylol propane initiator, having a weight average molecular weight of about 440, called JEFFAMINE ® T-403 from Texaco Chemical Co. Inc. |
| T-5000 | Polyoxypropylene triamine, made with glycerine initiator, having a weight average molecular weight of about 5,000, called JEFFAMINE ® T-5000 from Texaco Chemical Co. Inc. |
| UNILINK ® 4200 | Dialkyl substituted methylene dianiline, called UNILINK ® 4200 from UOP. |
| ZR-70 | 2,-(2-dimethylaminoethoxy-)ethanol, called TEXACAT ® ZR-70 from Texaco Chemical Company. |

Unless otherwise indicated, test results given in the examples use the following procedures:

Closed Cells is the average percentage of closed cells in the foam, determined by standard ASTM D-2856 procedure, and is given in percent.

Compressive Strength (parallel) is determined by standard ASTM D-1621 procedure, and is given in pounds per square inch (psi).

Density is determined by standard ASTM D-1622 procedure, and is given in pounds per cubic foot (pcf).

Elongation is determined by standard ASTM D-638 procedure, and is given in percent.

Gel Time, also called flow time, is the time after the reactants are combined for a gel to form stopping flow properties, and is given in seconds.

EXAMPLE 1: CHAIN EXTENDER PREPARATION

This example shows how to make low molecular weight, polyoxyalkylene polyamine chain extender by aminating polyoxyalkylene polyol.

Propoxylated α-methyl glucoside is first made by adding methyl glucoside (4.5 kg) and flaked potassium hydroxide (50.4g) to a five-gallon kettle. The reactor is then heated to 100° C. while maintaining a nitrogen purge. Propylene oxide (5.4 kg) is then slowly added at 105–110° C. at 50 psig over a period of about 6.5 hours. The reaction mixture is then maintained at an equilibrium pressure 110° C. and purged with nitrogen for one-half hour. The alkaline product is then neutralized at 95° C. by stirring two hours with an aqueous slurry of 550 g MAGNESOL ® 30/40 adsorbent. The neutralized product is then vacuum stripped to a minimum pressure, nitrogen stripped and filtered. Properties of the alkoxylated product are as follows:

| | |
|---|---|
| Hydroxyl no. (mg KOH/g) | 504 |
| Water (wt %) | 0.15 |
| pH (in 10:6 isopropanol-water) | 7.3 |
| Sodium (ppm) | 23 |
| Potassium (ppm) | 0.7 |

The amination is then carried out by continuously feeding the α-methyl glucoside propoxylate, ammonia and hydrogen to a tubular reactor containing 600 milliliters of a nickel-copper-chromium catalyst as described in U.S. Pat. No. 3,152,998 (Moss), at rates of 0.35 and 0.52 pounds per hour and 25 liters per hour, respectively. The reaction is conducted at a temperature of 205° C. and a pressure of 2000 psig. The aminated product is stripped at a temperature of 100° C. under 5 mm Hg pressure for one hour. Using the previously described procedures, the product is analyzed to have a total acetylatables content of 9.06 milliequivalents per gram (meq/g), a total amine content of 6.24 meq/g, and a primary amine content of 6.02 meq/g. The product is an aminated α-methyl glucoside propoxylate having a structure:

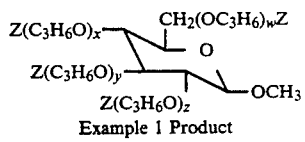
Example 1 Product wherein an average of at least about 60% of the Z groups are amine and the rest are hydroxyl, and the sum of w, x, y and z is an average of about 4.

EXAMPLES 2-4C: SPRAYED POLYUREA ELASTOMER SYNTHESIS & ANALYSIS

Examples 2 and 3 show how to make polyurea elastomers using chain extender made in Example 1. Example 4C is similar to Example 3 except that the chain extender of Example 1 is replaced a corresponding amount of low molecular weight, trifunctional polyoxyalkylene polyamine chain extender.

Polyisocyanate quasi-prepolymer is prepared by mixing equal weight parts of m-TMXDI ® and D-2000 with vigorously agitation under ambient conditions. The reaction takes approximately 15 minutes to complete. The components listed in Table I, i.e. polyisocyanate quasi-prepolymer and a blend of polyoxyalkylene polyamines and chain extenders, are spray mixed onto mold released, steel panel at an isocyanate to amine volume ratio of 1.00, using a plural component, QUSMER ® VR-H-2000 proportioner fitted with a GX-7 spray gun, at block and hose temperatures of 150° F. and at a rate of 26 pounds per minute total mixture. Each component is fed at a line pressure of from 1,000 to 2,000 psig. The resulting film cures in a few seconds and is tested using the previously described procedures, with the results shown in Table I.

TABLE I
SPRAYED POLYUREA ELASTOMER PREPARATION AND ANALYSIS

| Example No. | 2 | 3 | 4C |
|---|---|---|---|
| Component (A) | Polyisocyanate Quasi-Prepolymer | | |
| Component (B): | | | |
| T-5000 | 33.8 | 32.2 | 32.0 |
| D-2000 | 22.5 | 21.5 | 21.3 |
| T-403 | — | — | 26.7 |
| D-230 | 26.9 | 19.5 | 20.0 |
| Example 1 Amine | 16.9 | 26.8 | — |
| Processing: | | | |
| Index | 1.05 | 1.05 | 1.05 |
| Iso/Res volume ratio | 1.00 | 1.00 | 1.00 |
| Iso/Res weight ratio | 1.07 | 1.07 | 1.08 |
| Gel time (sec) | 2.5 | <2.0 | <2.0 |
| Tack Free (sec) | <10 | <10 | 10 |
| Elastomer Properties: | | | |
| Tensile Strength (psi) | 1,262 | 936 | 951 |
| Elongation (%) | 542 | 357 | 391 |
| Tear Strength (pli) | 240 | 218 | 234 |
| Shore D Hardness: | | | |
| 0 sec | 40 | 40 | 40 |
| 10 sec | 27 | 27 | 27 |
| Shore A Hardness (0 sec) | 82 | 79 | 79 |
| 100% Modulus (psi) | 430 | 498 | 420 |
| 300% Modulus (psi) | 675 | 813 | 713 |

Polyurea elastomer made from the amine of Example 1 cures faster than corresponding elastomer made with trifunctional chain extender, shown by the lower tack free values. This occurs even in Example 2 having a longer gel time. Comparing Example 3 with Example 4C shows significant increases in modules properties indicating improved stiffness.

EXAMPLES 5-8C; FOAMED POLYUREA ELASTOMER SYNTHESIS & ANALYSIS

Examples 5 and 7 show how to make polyurea elastomer foams using low molecular weight, tetrafunctional polyoxyalkylene polyamine chain extender. Examples 6C and 8C are similar to Examples 5 and 7, respectively, except that the reaction is conducted without the chain extender of this invention.

The components listed in Table II, i.e. polyisocyanate, polyoxyalkylene polyamines, with or without amine chain extender of Example 1, and other components including additional chain extender, foam stabilizer, blowing agent and catalyst, are spray mixed following the procedure set forth in Examples 2-4C described previously. The resulting foam cures in a few seconds and is tested using the previously described procedures, with the results shown in Table II.

TABLE II
POLYUREA ELASTOMER FOAM PREPARATION AND ANALYSIS

| Example No. | 5 | 6C | 7 | 8C |
|---|---|---|---|---|
| Component (A): | | | | |
| LF-168 | 60 | 60 | — | — |
| PPG-2000 | 40 | 40 | — | — |
| MDI-Polymer | — | — | 100 | 100 |
| Component (B): | | | | |
| T-5000 | 28.6 | 34.9 | 62.6 | 71.2 |
| D-2000 | 7.2 | 8.7 | 17.9 | 17.8 |
| Example 1 Amine | 17.9 | — | 8.9 | — |
| DETDA | 17.9 | 26.2 | — | — |
| UNILINK ® 4200 | 6.3 | 8.2 | — | — |
| DC-193 | 0.45 | 0.55 | — | — |
| L-5309 | — | — | 1.8 | 1.8 |
| Water | — | — | 6.4 | 6.9 |
| ZR-70 | — | — | 2.4 | 2.4 |
| GENTRON ® 123 | 21.7 | 21.5 | — | — |
| Processing: | | | | |
| Index | 1.10 | 1.10 | 1.10 | 1.10 |
| A/B Vol. Ratio | 1.00 | 1.00 | 1.00 | 1.00 |
| A/B Wt. Ratio | 0.97 | 0.96 | 1.20 | 1.20 |
| Gel Time (sec) | <2.0 | collapsed | <2.0 | 3.0 |
| Elastomer Properties: | | | | |
| Density (pcf) | — | — | 3.8 | 1.5 |
| Closed Cells (%) | — | — | 23.96 | 10.6 |
| Compressive Strength (psi) | — | — | 11.1 | 1.26 |
| Modulus (psi) | — | — | 163.0 | 10.6 |

Polyurea elastomer foam can be made using the amine of Example 1, unlike the corresponding foam in Example 6C without the chain extender of this invention which collapsed. A higher percentage of closed cells and much higher compressive strength and modulus values are shown by the foam of Example 7 using the amine of Example 1, as compared with the foam of Example 8C, due in part to an increase in density but primarily due to incorporation of amine made in Example 1. It is believed that the higher (tetra-)functionality of the amine of Example 1 gives more crosslinking leading to better structural support in the foam. This produces higher compressive strength and modulus forms a better polymer matrix. The di- and tri-functionality of the other amines used in Example 6C and 8C, do not provide such structure or results.

We claim:
1. Polyurea elastomer which is the product of:
(A) polyisocyanate, reacted with;
(B) di- and/or tri-functional polyoxyalkylene polyamine and low molecular weight, polyoxyalkylene polyamine chain extender having at least four functional groups including two or more amino groups.

2. The polyurea of claim 1 wherein the chain extender is one or more compounds having a structure:

wherein:
Q is the polyvalent residue of an active hydrogen-containing compound after removal of the active hydrogen;
each R is independently hydrogen or lower alkyl;
each x is independently at least 0.5;
y is at least 4; and
each Z is independently an amino or other active hydrogen-containing functional group, provided that two or more Z are amino.

3. The polyurea of claim 2 wherein Q is a saccharide residue, R are hydrogen and/or methyl, x averages from about 1 to about 40; y is from 4 to about 8, and at least about half the Z groups are amino.

4. The polyurea of claim 3 wherein Q is an α-methyl glucoside residue such that y is 4, all R are methyl, X averages about 1, and an average of about 60% of all Z are amino.

5. The polyurea of claim 1 wherein the polyisocyanate is monomeric polyisocyanate or quasi-prepolymer made by reacting polyoxyalkylene polyamine with a stoichiometric excess of monomeric polyisocyanate.

6. The polyurea of claim 5 wherein the polyoxyalkylene polyamines, except the chain extender, have a structure:

wherein:
Q is the polyvalent residue of an active hydrogen-containing compound after removal of the active hydrogen;
each R is independently hydrogen or lower alkyl;
each x is at least 1; and
y is at least 2.

7. The polyurea of claim 6 wherein: the monomeric polyisocyanate is 1,3-bis(1-isocyanato-1-methylethyl)-benzene, methylene diisocyanate polymer, or uretonimine modified methylene diisocyanate; and the polyoxyalkylene polyamine is polyoxypropylene diamine or triamine having an average molecular weight of from about 200 to about 5,000.

8. A foam comprising gas and the polyurea of claim 1.

9. A process for making polyurea elastomer comprising:

(1) reacting polyisocyanate with;
(2) di- and/or tri-functional polyoxyalkylene polyamine and low molecular weight, polyoxyalkylene polyamine having at least four functional groups including two or more amino groups.

10. The process of claim 9 wherein the chain extender has a structure:

wherein:
Q is, the polyvalent residue of an active hydrogen-containing compound after removal of the active hydrogen;
each R is independently hydrogen or lower alkyl;
each x is independently at least 0.5; and
y is at least 4; and
each Z is independently an amino or other active hydrogen-containing functional group, provided that two or more Z are amino.

11. The process of claim 10 wherein Q is a saccharide residue, R are hydrogen and/or methyl, x averages from about 1 to about 40; y is from 4 to about 8, and at least about half the Z groups are amino.

12. The process of claim 11 wherein Q is an α-methyl glucoside residue such that y is 4, all R are methyl, and x averages about 1, and an average of about 60% of all Z are amino.

13. The process of claim 9 wherein the polyisocyanate is monomeric polyisocyanate or quasi-prepolymer made by reacting polyoxyalkylene polyamine with a stoichiometric excess of monomeric polyisocyanate.

14. The process of claim 13 wherein the polyoxyalkylene polyamines, except the chain extender, have a structure:

wherein:
Q is the polyvalent residue of an active hydrogen-containing compound after removal of the active hydrogen;
each R is independently hydrogen or lower alkyl;
each x is at least 1; and
y is at least 2.

15. The polyurea of claim 14 wherein: the monomeric polyisocyanate is 1,3-bis(1-isocyanato-1-methylethyl)-benzene, methylene diisocyanate polymer, or uretonimine modified methylene diisocyanate; and the polyoxyalkylene polyamine is polyoxypropylene diamine or triamine having an average molecular weight of from about 200 to about 5,000.

* * * * *